United States Patent
Koren et al.

(10) Patent No.: US 6,920,973 B2
(45) Date of Patent: Jul. 26, 2005

(54) INTEGRATED RECONFIGURABLE MANUFACTURING SYSTEM

(75) Inventors: Yoram Koren, Ann Arbor, MI (US); Rodney L. Hill, Milar, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 15 days.

(21) Appl. No.: 10/464,934

(22) Filed: Jun. 19, 2003

(65) Prior Publication Data

US 2004/0255449 A1 Dec. 23, 2004

(51) Int. Cl.$^7$ .............................................. B21B 37/00
(52) U.S. Cl. .................. 198/339.1; 198/575; 198/346.2
(58) Field of Search ............................. 198/339.1, 575, 198/346.1–346; 700/96, 112, 113, 230; 414/220.07; 29/563, 38.9, 564

(56) References Cited

U.S. PATENT DOCUMENTS

| | | | | |
|---|---|---|---|---|
| 5,078,254 A | * | 1/1992 | Colonius et al. | ......... 198/345.3 |
| 5,452,199 A | * | 9/1995 | Murata | ........................... 700/2 |
| 5,880,965 A | * | 3/1999 | Nakamura et al. | .......... 700/175 |
| 5,943,750 A | | 8/1999 | Koren et al. | |
| 6,321,138 B1 | * | 11/2001 | Livesay et al. | .............. 700/245 |
| 6,349,237 B1 | | 2/2002 | Koren et al. | |
| 6,557,235 B1 | | 5/2003 | Katz et al. | |
| 6,567,162 B2 | | 5/2003 | Koren et al. | |
| 6,569,071 B1 | | 5/2003 | Koren et al. | |
| 6,675,066 B2 | * | 1/2004 | Moshgbar | .................... 700/229 |

* cited by examiner

*Primary Examiner*—Eileen D. Lillis
*Assistant Examiner*—Mark A. Deuble
(74) *Attorney, Agent, or Firm*—Harness, Dickey & Pierce, P.L.C.

(57) ABSTRACT

An integrated reconfigurable multi-stage manufacturing system and associated methods. The system may include a plurality of manufacturing cells, each cell associated with at least one stage of a manufacturing process. The plurality of cells may include a first cell comprising at least one flexible manufacturing station, a second cell comprising at least one reconfigurable manufacturing station, and a third cell comprising at least one reconfigurable inspection machine. The system may also include a plurality of loop conveyors and a plurality of cell gantries. Each loop conveyor may connect at least two neighboring cells and each cell gantry may transport parts from the cell associated with the cell gantry to at least one loop conveyor. In one embodiment, each cell may be hexagonal, and the manufacturing system may have a honeycomb structure.

16 Claims, 15 Drawing Sheets

INTEGRATED RECONFIGURABLE MANUFACTURING SYSTEM

FEDERALLY SPONSORED RESEARCH

Certain of the research leading to the present invention was sponsored by the United States Government under National Science Foundation Grant No. EEC-959125. The United States Government has certain rights in the invention.

BACKGROUND OF THE INVENTION

The production of many parts and products is done by multi-stage manufacturing systems. At each stage, certain production equipment performs a particular manufacturing operation that may include several tasks. A task may be, for example, drilling a hole or welding a spot, or inserting a pin in a hole. The partly-finished part is transferred from one stage to the next via a material transport system, such as a conveyor, a robot, an autonomous guided vehicle (AGV), an overhead gantry, or by people. This multi-stage production method is typical to medium and high-volume manufacturing of a variety of parts and products ranging from engines, pump housings, appliances, cars, to microprocessors. The specific production equipment in the system at each stage depends on the production domain. In machining operations, for example, the production equipment may be a machine tool or an inspection station. In assembly, the equipment may be a welding robot, and in microprocessor production—a chemical process.

Typically, these multi-stage manufacturing systems are built as a sequential, serial line. If the required volume of parts is higher (i.e., larger system capacity is needed), then a second serial line may be added. A recent survey conducted in Europe and the US by the NSF Engineering Research Center for Reconfigurable Manufacturing Systems at the University of Michigan reveals that industries are "Very Dissatisfied" with the large floor space that multi-stage systems occupy. Therefore, the reduction in floor space is an important challenge to the manufacturing industry.

Another challenge is how can one scale up a system production capacity in a cost-effective, rapid method when the market demand increases. Traditional machining systems, for example, are of two types: Dedicated and flexible. The dedicated systems include serial (sequential) production lines consisting of dedicated machines that are designed to produce only one particular part at very large quantities. The dedicated machines produce parts at a high production rate, which is achieved by performing on the part several tasks simultaneously. In other words, a dedicated machine uses parallel tools to drill or tap several holes simultaneously or cut surfaces simultaneously. For example, a dedicated machine can drill twenty holes of different diameters simultaneously by using a multi-tool spindle head, which enhances dramatically the productivity of the machine.

By contrast to dedicated systems, flexible manufacturing systems (FMS) can produce a variety of parts on the same system. The production equipment in FMS for machining includes mainly computerized numerically controlled (CNC) machine tools, each equipped with only one cutting tool (e.g., a drill of a particular diameter, or a milling cutter) whose motions are controlled by a computer. Compared to the dedicated machines, the CNC machines are slow. To drill twenty holes, for example, the drilling tool is moved to a point located above the first hole-location, then moved down to the fist hole location to drill the first hole, then retracted, and moved to the next hole location—a sequence of tasks that has to be repeated twenty times to drill the twenty holes. This is a much slower operation than that may be performed with a twenty-tool spindle-head on the dedicated machine. The CNC machine, however, is flexible because its cutting tool can be automatically changed, and a new-part program that controls the tool motions can be easily loaded into its computer. This flexibility allows using the system to produce new type of parts when needed, and also to produce several different types of parts on the same day using the same CNC machine. Thus, the CNC machines are critical enablers that make the whole machining system flexible.

Another challenge relates to in-process inspection of parts. Currently machining systems utilize two types of dimension inspection:

(1) In-process measurement by dedicated mechanical gauges that provide a binary "Good/Not-Good" (or "Go/No-Go") output. Each time that a different type of parts is produced, these gauges have to be changed. These gauges are limited to measuring a small number of dimensions, and cannot measure such features as surface flatness or parallelism of two surfaces; and (2) Measurements by Coordinate Measuring Machines (CMM) that are usually placed in a separate room. The finished parts are taken to the CMM for inspection. The CMM includes a one-dimensional measurement touch-probe that moves from one inspected point to the next while the coordinates of each point are measured. This is a slow process, such that it may take two to three hours for a part such as a cylinder head of a car engine to be inspected. During the inspection time, the system continues to produce parts at a rate of about 100 per hour. If, after three hours of inspection, a defected part is found, then some 200–300 parts have to be scrapped.

One solution to this problem may be provided by a Reconfigurable (in-process) Inspection Machine (RIM), which is described in U.S. Pat. No. 6,567,162, co-owned by the assignee, The Regents of the University of Michigan, and incorporated herein by reference in its entirety. It is still desirable, however, to integrate the RIM into the manufacturing system such that the production flow is not interrupted when the RIM requires maintenance or repairs. It is, therefore, not advisable to install the RIM in series with the manufacturing equipment.

SUMMARY

One embodiment of the invention provides an integrated reconfigurable multi-stage manufacturing system. The system may include a plurality of manufacturing cells, each cell associated with at least one stage of a manufacturing process. The plurality of cells may include a first cell comprising at least one flexible manufacturing station, a second cell comprising at least one reconfigurable manufacturing station, and a third cell comprising at least one reconfigurable inspection machine. The system may also include a plurality of loop conveyors and a plurality of cell gantries. Each loop conveyor may connect at least two neighboring cells and each cell gantry may transport parts from the cell associated with the cell gantry to at least one loop conveyor. In one embodiment, each cell may be hexagonal, and the manufacturing system may have a honeycomb structure.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE INVENTION

Figure 1A:
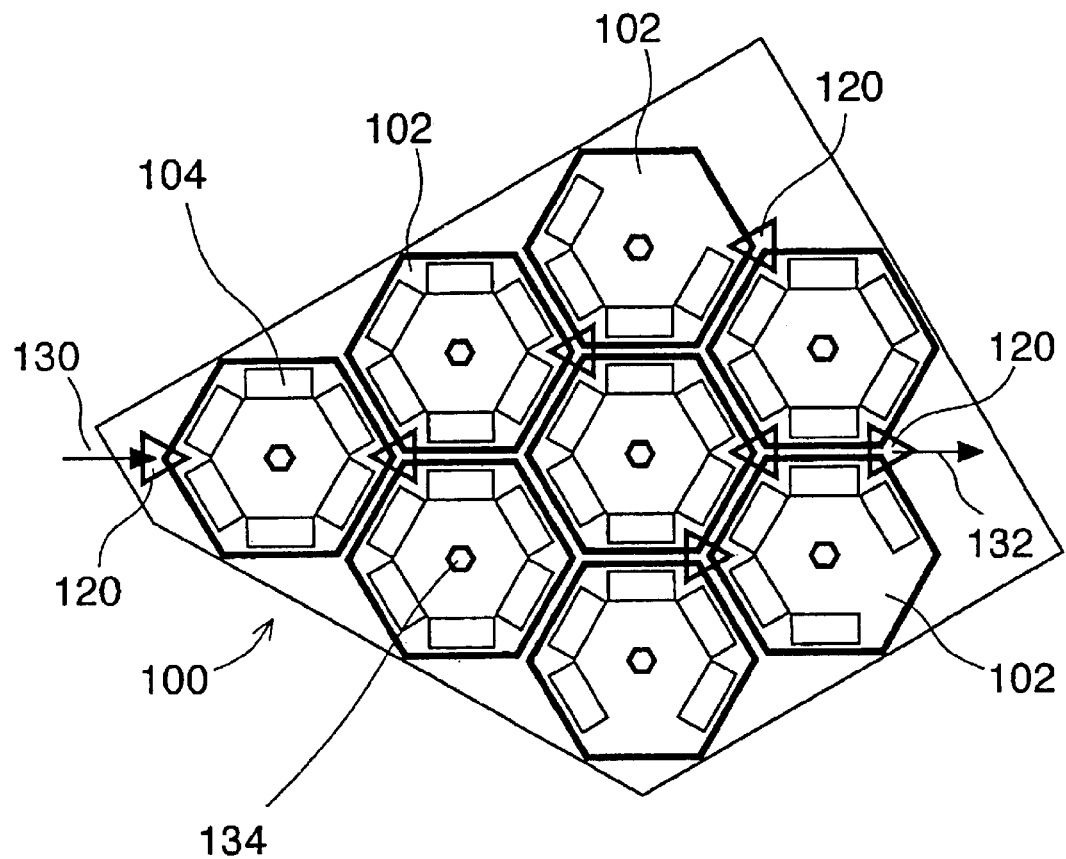
FIG. 1(a) is a diagram of an integrated multi-stage manufacturing system according to the present invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "up", "down", "top" or "bottom", are relative characterizations only based upon the particular position or orientation of a given component for a particular application.

Various embodiments of the present invention may address several manufacturing-systems problems, including the following:

(1) to provide in one system the high efficiency of dedicated lines, i.e. lines that are limited to produce a single part at a high production rate non-flexibly (hard automation), with the flexibility that the CNC machine provides, to form integrated high-productivity flexible systems;

(2) to provide the manufacturing system with the ability to process several parts at the same time without loss of the high productivity of dedicated machines;

(3) to integrate in-process non-dedicated inspection into the manufacturing system, such as, for example, machining systems that produce precise parts with up to 10-micrometer accuracy.

Figure 1B:
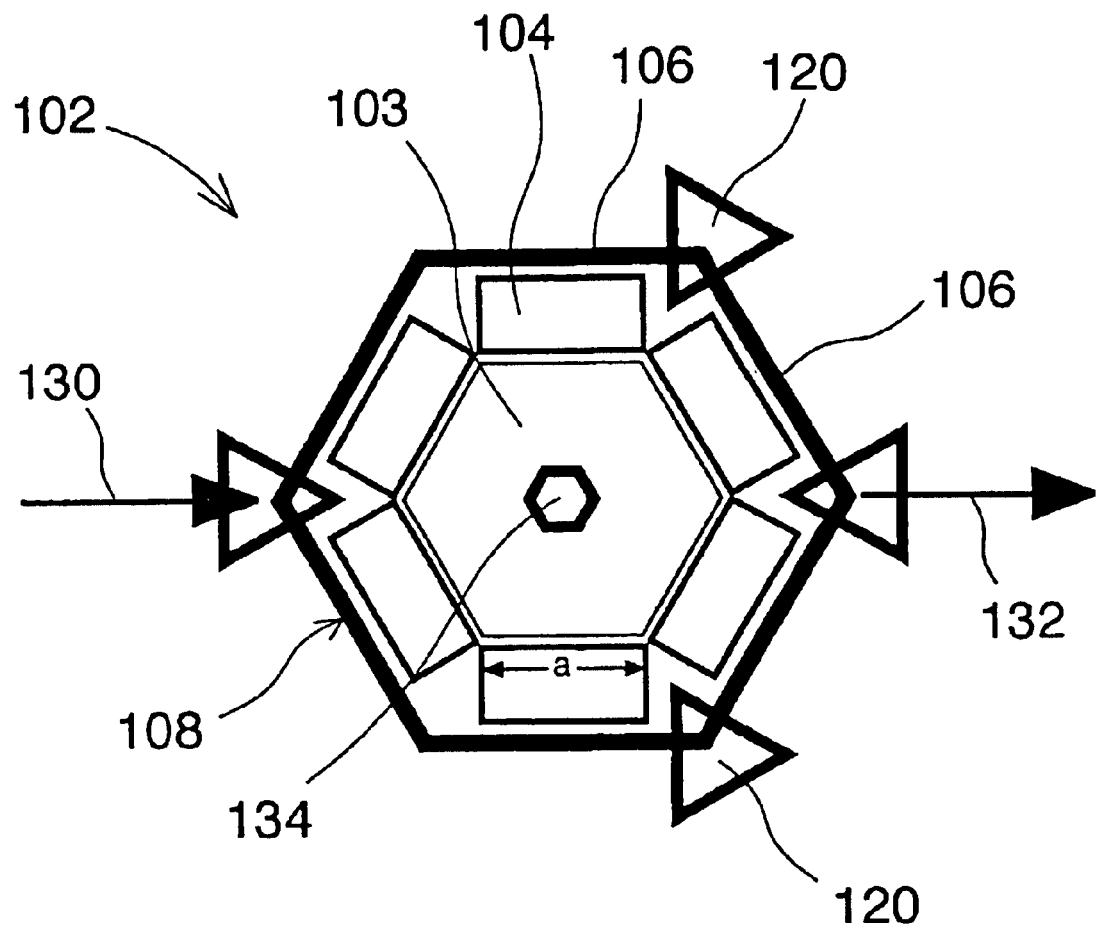
FIG. 1(b) is a diagram of an embodiment of a cell for the integrated multi-stage manufacturing system of FIG. 1(a)
Figure 2:
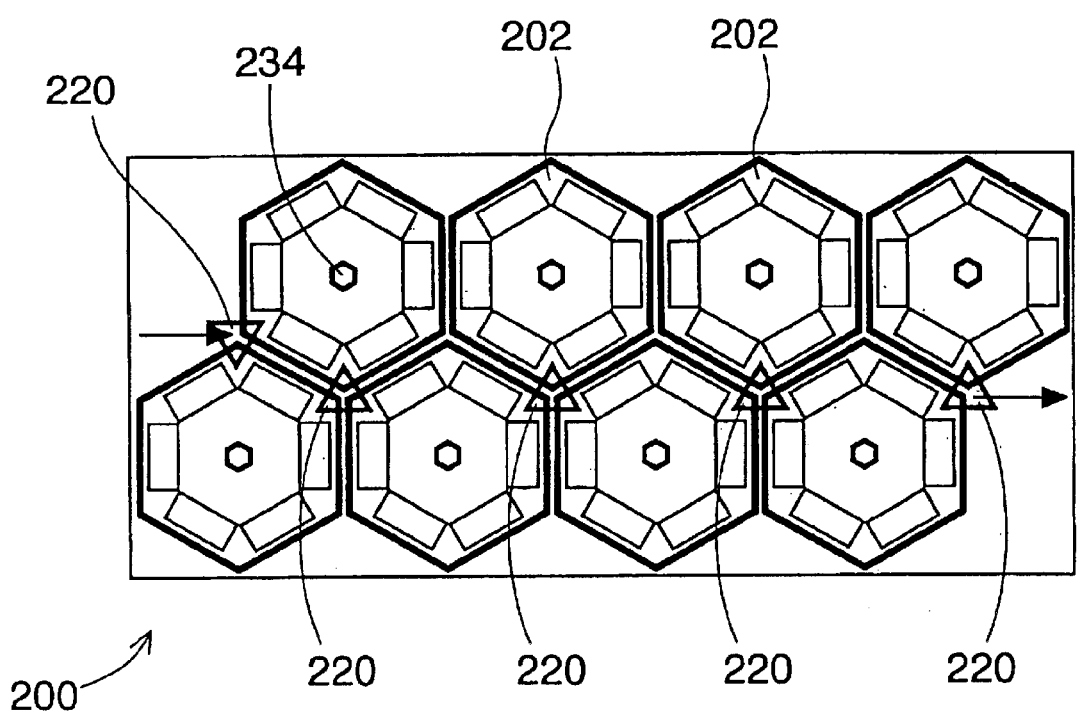
FIG. 2 is another embodiment of an integrated multi-stage manufacturing system.
Figure 5:
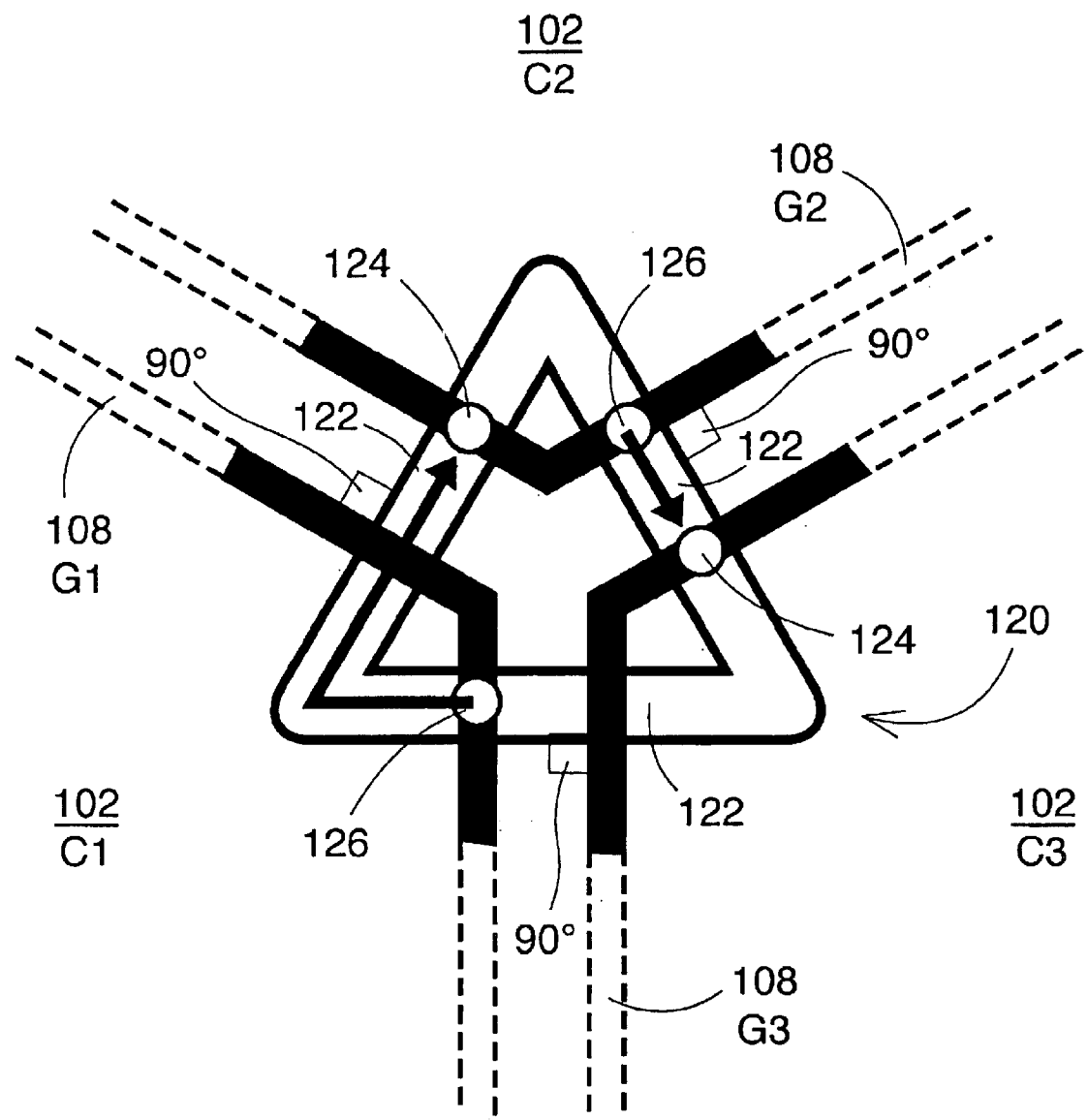
FIG. 5 is an embodiment of a loop conveyor.

FIG. 1(a) depicts an embodiment of an integrated manufacturing system 100 that includes a plurality of cells 102. In this embodiment, each cell 102 has hexagonal shape, as shown in FIG. 1(b), and the resulting manufacturing system 100 has a honeycomb structure. FIG. 2 shows another embodiment of a manufacturing system 200 that has a different honeycomb layout, one in which no cell 202 shares more than four sides with another cell 202. A comparison of the floor space occupied by the honeycomb manufacturing system embodiments 100 and 200 is shown in FIG. 5. For comparison, both embodiments 100, 200 are shown to comprise the same number of cells 102, 202, which is eight, in this example.

Each cell 102 may contain several manufacturing stations or machines 104. It is typically desired that all the manufacturing stations 104 in a cell 102 are identical to form a single manufacturing stage. It will be appreciated, however, that the manufacturing stations 104 of one cell 102 may not be all of the same type, such that two or more manufacturing stages are contained in the same cell 102. For example, one cell 102 may include manufacturing stations 104 for drilling only, such that that particular cell 102 is associated with a drilling manufacturing stage. Other manufacturing stages may similarly correspond to other manufacturing operations, such as welding, machine inspection, etc. Moreover, a manufacturing or machining operation may be of the flexible type utilizing CNC machine tools, or of the dedicated hard automation type, or of the reconfigurable type that includes reconfigurable parallel tools. Similarly, a machine inspection operation may use dedicated mechanical gauges, or inspection machines of the CMM- or RIM-type, as will be described below in further detail.

The number of the manufacturing stations 104 may be calculated to meet the required production capacity (i.e., volume) of the manufacturing system 100. Each cell 102 may contain, for example, six identical manufacturing stations 104, and each manufacturing station 104 may be installed close to one of the hexagon sides 106 of the cell 102 for ease of loading/unloading parts. However, any cell 102 may contain fewer than six manufacturing stations 104—a case that facilitates the scaling up of the manufacturing system capacity by adding new manufacturing stations 104 to existing cells 102. Similarly, any cell 102 may contain more than six manufacturing stations—two or more manufacturing stations 104 may be installed at any side 106 of the hexagonal cell 102.

The manufacturing system 100 may include an incoming material transport system 130 to bring raw parts or material and an outgoing material transport system 132 to remove finished parts or products from the system 100. The incoming and outgoing material transporters 130, 132 may be conveyors, gantries, AGVs, etc. Each cell 102, may also include a cell control station 134.

Figure 3A:
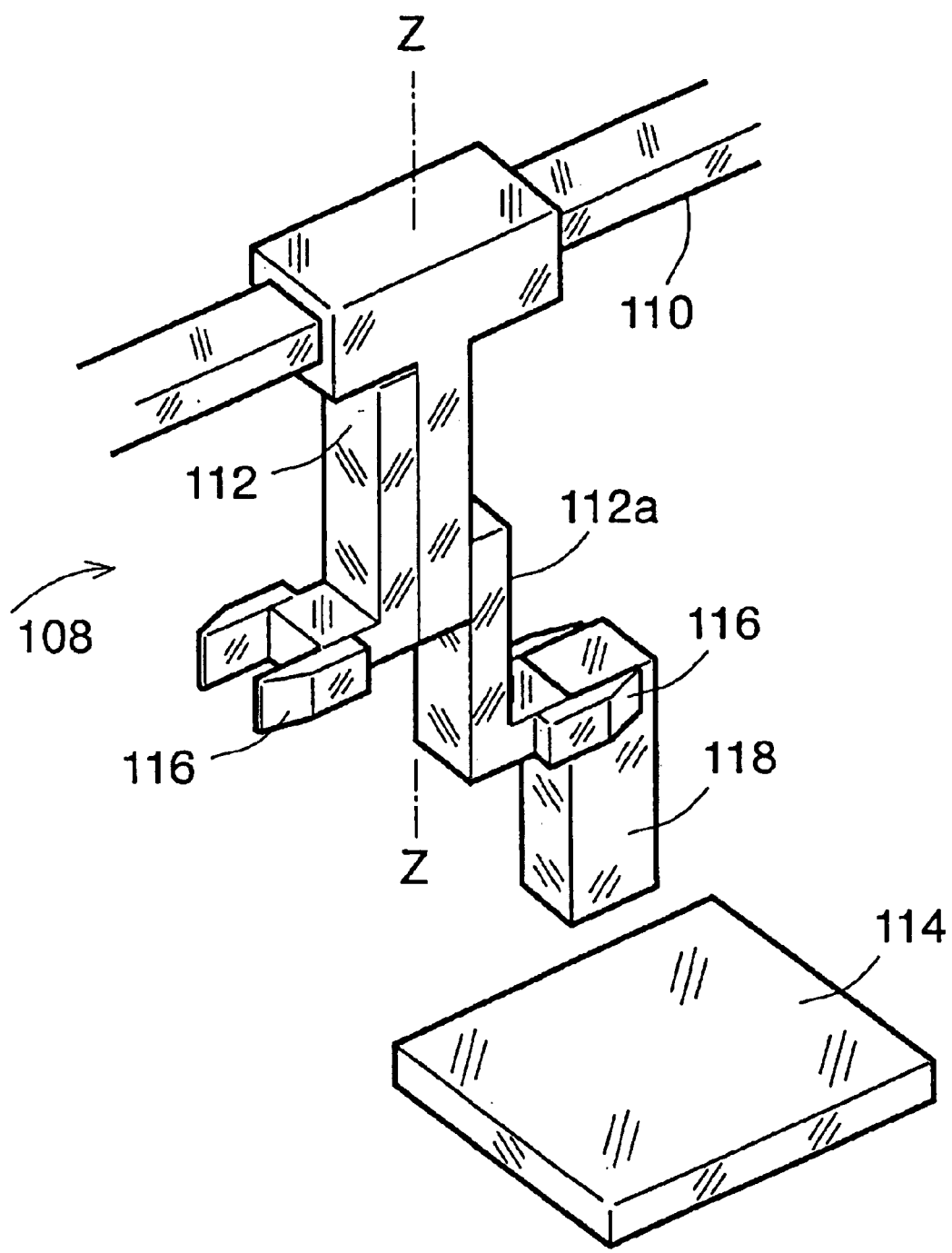
FIG. 3(a) is an elevated view of an embodiment of a cell gantry for the integrated multi-stage manufacturing system of FIG. 1(a)
Figure 3B:
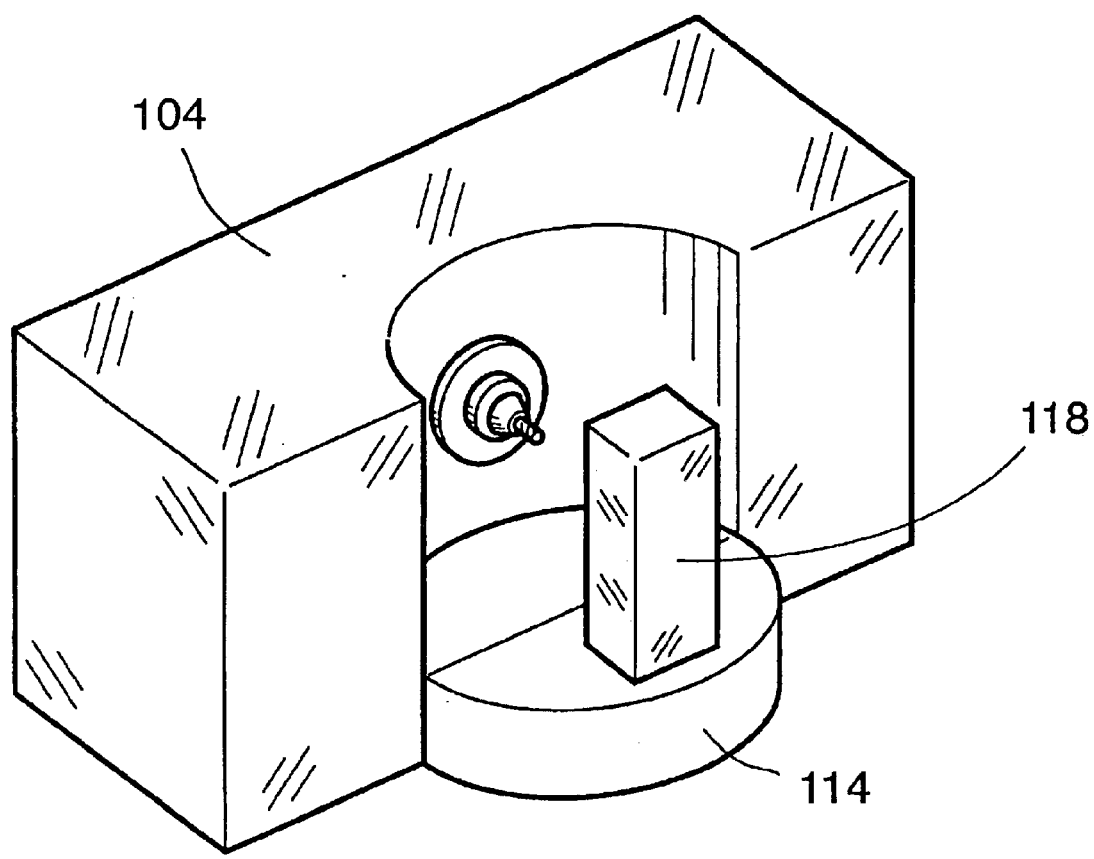
FIG. 3(b) is a top view of a rotary machine table for the integrated multi-stage manufacturing system of FIG. 1(a)

All material-handling functions at each cell 102 may be performed by an overhead cell gantry 108 that moves along the hexagon sides 106 on special gantry tracks 110 and serves all the manufacturing stations 104 in the cell 102. See FIG. 3(a). The cell gantry 108 may have first and second arms 112, 112a. Each arm 112 may move up and down parallel to the direction of an axis Z—Z which is perpendicular to each machine table 114 associated with each manufacturing station 104. The machine table 114 may be a rotary table, such as a 180-degree index table. See FIG. 3(b). Each arm 112, 112a may have a gripper 116, 116a at its end to load and unload parts 118 to and from the machine tables 114 of the manufacturing stations 104. The gantry tracks 110 are located near the perimeter of each cell 102 to enable the gantry grippers 116, 116a to approach the machine table 114 for loading and unloading of parts 118. When new manufacturing stations or machines 104 are added to a cell 102, the corresponding gantry 108 may be re-programmed to serve also the new machines 104.

The gantry 108 may approach a position above the machine table 114 with the first gripper 116 empty and the second gripper 116a holding one part 118 that has to be loaded onto a corresponding manufacturing station 104. First, the empty gripper 116 is lowered to take the ready machined-part 118 from the machine table 114 and then it moves up with this part 118. Then the gantry 108 moves slightly along its track 110 and the gripper 116 with the new part 118 is lowered, loads the part 118 on the machine table 114, and then moves back up with the gripper empty. The machine table 114 with the new part 118 rotates 180 degrees to place the part 118 in the workspace of the production equipment of the corresponding manufacturing station 104, and the manufacturing station 104 starts its operation on the part 118. When the operation is done, the machine table 114 rotates 180 degrees and the part 118 is ready to be picked up by the gantry 108.

The gantry 108 takes the partly-machined part 118 and moves to a location above a loop conveyor 120 that is shared with another cell 102 to which the part 118 has to be transferred next. The gripper 116a with the partly-machined part 118 is lowered to the level of the loop conveyor 120, the gripper 116a opens its jaws and puts the part 118 on the loop conveyor 120. Then the empty gripper 116a moves up and the gantry 108 moves to a position above the loop conveyor 120 that contains the parts 118 that have to be machined in one of the manufacturing stations 104 of the cell 102 that this gantry 108 serves. Thus, each cell 102 has its own gantry 108. The gantry tracks 110 of adjacent cells 102 are installed close to each other in the shared sides 106 of the hexagon. Although the material transfer operation is illustrated with overhead gantries 108, it will be appreciated that other types of material transfer systems may be used depending on the manufacturing system and its layout. It is desirable that the material transfer system allows ease access to the manufacturing stations for service and maintenance, as illustrated with the overhead gantries 108 of a manufacturing system 100 having a honeycomb structure, as shown in FIG. 1(a).

Each loop conveyor 120 may be a closed-loop conveyor that transfers parts 118 between cells 102 and may also store parts 118 temporarily, in case of material transfer failure, for example. The loop conveyor 120 may be circular, square, triangular, or of any shape that may be convenient to control for the shape of the cells 102. For hexagonal cells 102, a triangular loop conveyor 120 may be conveniently used for loading/unloading. See FIG. 5. The triangular conveyor 120 may be installed such that its sides 122 may form a 90-degree angle with the tracks 110 of the gantries 108 that the loop conveyor 120 serves to facilitate the loading and unloading of parts 118.

The loop conveyor 120 may be programmed to move the parts 118 in a controlled fashion. For example, each time a pick-up point 124 is empty, the next part 118 on the loop conveyor 120 may be moved from a placement point 126 where it waits for its turn into the pick-up point 124. When any part 118 is occupying the pick-up point 124, then the next part 118 on the loop conveyor 120 waits for its turn. In the example illustrated in FIG. 5, the loop conveyor 120 serves both as a pick-up loop conveyor 120a from which the gantry 108 picks up parts 118 to be processed in a cell 102, and as placement loop conveyor 120b to which the gantry 108 brings parts 118 after processing in the cell 102, although two different loop conveyors 120 could also be used for the purpose. In particular, the loop conveyor 120 may serve three adjacent cells 102 designated as C1, C2, C3 in FIG. 5, each of which may be served by corresponding gantries 108, designated as G1, G2, G3 in FIG. 5. For example, gantry G1 may place on the loop conveyor 120 parts 118 that have been processed in cell C1; gantry G2 may pick up parts 118 from the loop conveyor 120 and also place them back on the loop conveyor 120 after the parts 118 have been processed in cell C2; gantry G3 may pick up parts 118 from the loop conveyor 120 for processing in the cell C3.

The combination of gantry speed and the location of the loop conveyors 120 may determine the minimum time for the gantry 108 to serve all the manufacturing stations 104 in any cell 102. The gantry working cycle time T for serving the manufacturing stations 104 in any cell 102 is composed mainly of motion time and loading/unloading time. If the acceleration/deceleration time is very fast, it may be assumed that the traveling time is proportional to the distance traveled.

Figure 4A:
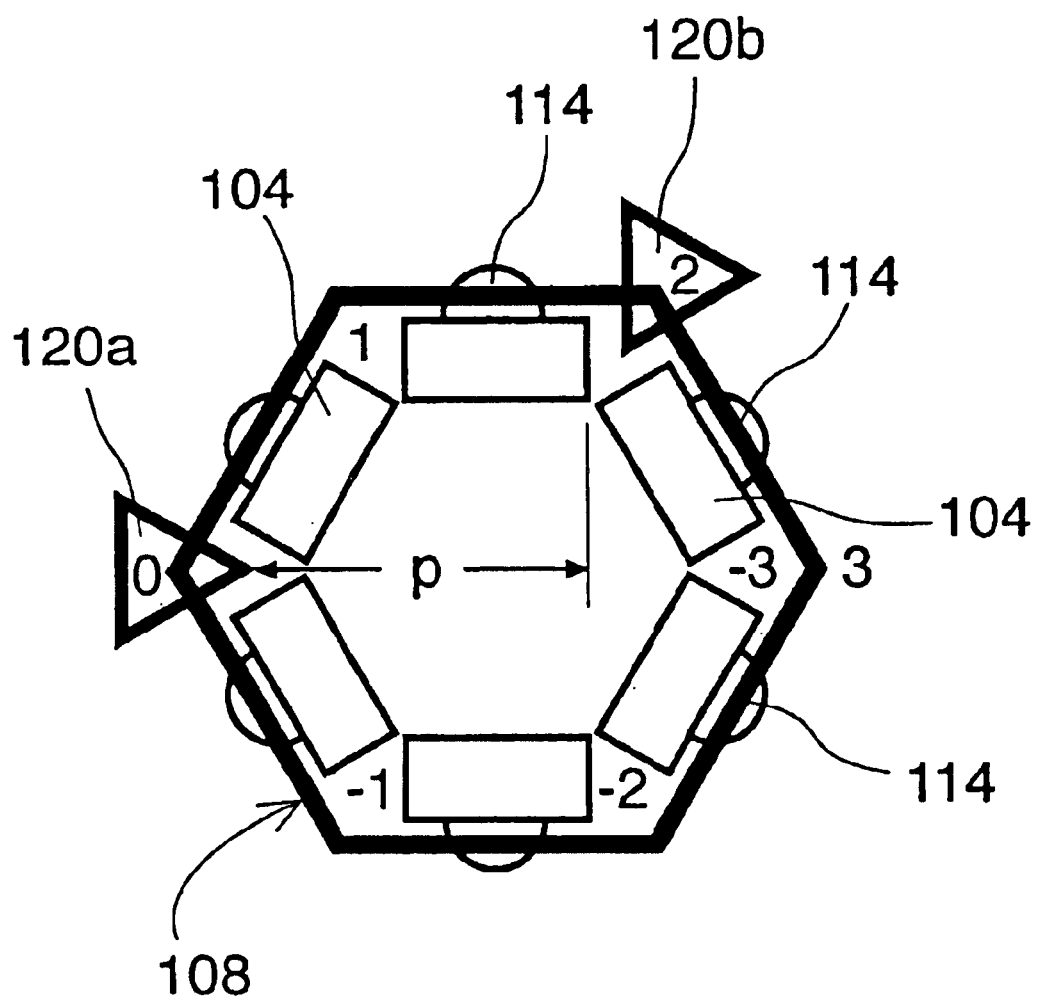
FIG. 4(a) is a diagram of a cell for determining loop conveyor distance p.

The time required for the gantry to travel between two successive manufacturing stations 104 is $T_1$. Referring to FIG. 4(a), since the loop conveyor 120 is placed between manufacturing stations 104, the time required for the gantry 108 to travel from the loop conveyor 120 to the nearest manufacturing station 104 is $0.5T_1$. As a first example let us assume the case that the pick-up point 124 of new parts and the placement point 126 of the finished machined parts are on the same loop conveyor 120 (namely, p=0). See FIG. 5. The horizontal traveling time for a loading/unloading cycle of six (6) machines is calculated in this case as follows:

(a) First and sixth manufacturing stations 104: the gantry 108 picks up a part 118 from the loop conveyor 120, moves to the manufacturing station 104 ($0.5T_1$), unloads the finished part 118 and loads the new part 118, and then moves back ($0.5T_1$). Therefore, the time is $T_1$ per manufacturing station 104, and $2T_1$ for the first and sixth manufacturing stations 104. (b) Second and fifth manufacturing stations 104. A similar calculation yields $6T_1$ for the these two manufacturing stations 104. (c) Third and fourth manufacturing stations 104. A similar calculation yields $10T_1$. Altogether, for p=0, the cycle time for six manufacturing stations 104 is ($18 \times T_1$).

As a second example let us consider the conveyor placement of FIG. 4a (p=2). The loading/unloading cycle of six (6) manufacturing stations 104 is calculated as follows:

First manufacturing station 104: The gantry 108 picks up a part 118 from the pick-up loop conveyor 120a, moves to the manufacturing station 104 (0.5T1), unloads the finished part 118 and loads the new part 118, and then moves to the placement loop conveyor 120b ($1.5T_1$). Next the gantry 108 moves back to the pick up loop conveyor 120a ($2T_1$) to start a new load/unload cycle. The total time is $4T_1$. Second manufacturing station 104: the time is also $4T_1$. Third manufacturing station 104: the time is $2.5T_1+2.5T_1=5T_1$. Fourth and Fifth manufacturing stations 104: the time is $6T_1$. Sixth manufacturing station: the time is: $0.5T_1+2.5T_1+2T_1=5T_1$. The total gantry working time for six manufacturing stations 104 in this example is:

$$4T_1+4T_1+5T_1+6T_1+6T_1+5T_1=30T_1=(18+6p) \times T_1.$$

As a third example assume that the distance between the two loop conveyors 120 is p=3, then for each manufacturing station 104 unloading/loading, after placing a finished part 118 on a loop conveyor 120, the gantry 108 has to travel from the placement conveyor 120*b* to the pick-up conveyor 120*a*, which takes additional time of $3T_1$ (or $pT_1$) compared with the case of p=0. For six manufacturing stations 104 the additional time over the basis of $18T_1$ is $(6p) \times T_1$. Therefore, the general equation for the gantry's 108 horizontal traveling time is $(18+6p) \times T_1$. Regarding the gantry's 108 second component of non-traveling time, there are four equal time periods: unloading a manufacturing station 104, loading a manufacturing station 104, placing the part 118 on a loop conveyor 120, picking up a part from a loop conveyor 120. The time needed for one of the arms 112, 112*a* to go down, grip a finished part 118 from the machine table 114 (or a new part 118 from the loop conveyor 120) and go up with the part 118 is $T_2$ seconds. $T_2$ is also the time needed for one of the arms 112, 112*a* of the gantry 108 to go down with a part 118 to a machine table 114 (or a loop conveyor 120), open its gripper 116, 116*a* to release the part 118, and then to go back up. Each cycle of unloading/loading of a manufacturing station 104 takes thereby $4T_2$ seconds. Therefore, the time needed to load/unload six (6) machines is $24T_2$. This time is independent of the conveyor location p. Combining the two components, the total gantry cycle time may be estimated from the following Equation 1 for a cell with six manufacturing stations:

$$T=[18+6|p|]T_1+24T_2 |p|=0, 1, 2, 3 \qquad \text{Equation 1}$$

Figure 4B:
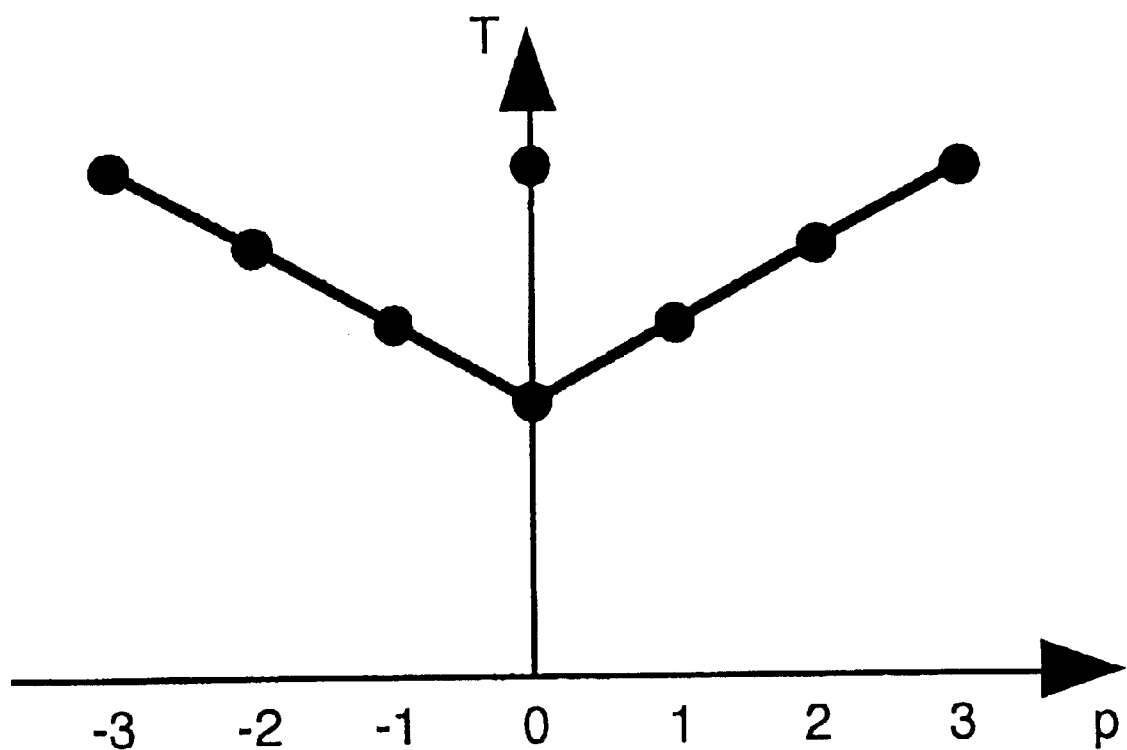
FIG. 4(b) is a graph of gantry working time T versus distance p.

In this equation, $T_1$ is the traveling time between two successive manufacturing stations 104, p is the distance between the pick-up loop conveyor 120*a* and the placement loop conveyor 120*b*, where p is measured in units that correspond to the number of intervening manufacturing stations 104, and $T_2$ is the time to load or unload, i.e. the time to pick up a part 118 from the manufacturing station 104 or from the pick-up loop conveyor 120*a*, and also the time to place a part 118 on the machine table 114 or on the placement loop conveyor 120*b*. See FIG. 4(*a*). Equation 1 is illustrated in FIG. 4(*b*), where positive p corresponds to clockwise direction and negative p corresponds to counter-clockwise direction, and p is the vertex number as marked in FIG. 4(*a*). The distance p in FIG. 4(*a*) is p=2. A distance of p=0 means that the pick-up loop conveyor 120*a* and the placement loop conveyor 120*b* are the same, yielding the minimum traveling time. Because the loop conveyor 120 may also transfer parts 118 between adjacent cells, setting p=0 may not be feasible. Instead, the distance p may be minimized while allowing such transfer between adjacent cells, as shown in the placement of loop conveyors 220 in the embodiment 200 of FIG. 2, for example. FIG. 4*b* also shows that the total gantry time needed for the manufacturing system 200 is equal to the maximum possible working time in hexagonal cells 202.

The optimal shape for the cell 102 in terms of floor space reduction and enabling smooth motions of the gantry is hexagonal. In addition to the regular hexagon, from all the regular polygons only a triangle or square provide a space saving structure, i.e. only these three polygonal shapes, when positioned adjacent to each other, completely cover a plane (the floor space) with no gaps in between, as is described below. For triangular or square cells 102, however, the gantry 108 must make sharp turns of 60 degrees and 90 degrees, respectively. Motions with sharp turns reduce the reliability of the gantries 108 and may not be efficient. In contrast, in the hexagonal-shape cell 102, the gantry 108 turns at 120 degrees, which is a relatively smooth motion that does not affect the reliability of the gantry 108. Cells 102 with five sides, seven sides, or more than seven sides do not have the utilization of the floor space as is explained below.

Figure 6:
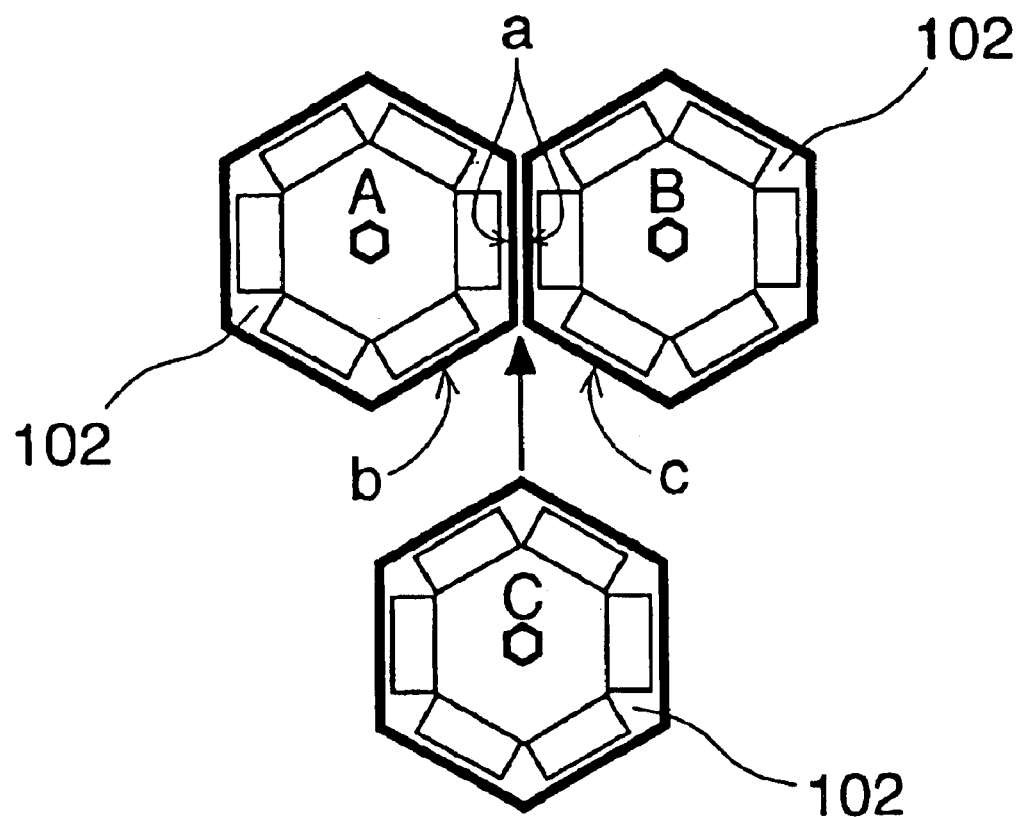
FIG. 6 is a diagram illustrated adding a hexagonal cell to an embodiment of an integrated multi-stage manufacturing system.

Given two identical regular polygons A and B with one shared (common) side "a", space occupied by such identical regular polygons will be minimized if an identical polygon (C) that will have one of its sides "b" shared (common) with one polygon (A), and another side "c" shared with one of the sides of the other polygon (B), as is shown depicted in FIG. 6. This problem may be expressed in the form of an equation as follows:

The interior angle for a regular polygon with n sides is (180−360/n). The maximum utilization of floor space depicted in FIG. 6 happens when a regular polygon with n sides (n>4) satisfies Equation 2:

$$2 \times \{180-(180-360/n)\}=180-360/n \qquad \text{Equation 2}$$

The solution of this equation is n=6. Therefore an array composed of regular hexagonal cells occupies the minimum floor space, i.e. a honeycomb structure is optimal for space utilization.

Hexagonal manufacturing cells 102 can be combined to form a manufacturing system 100 that has a space-saving honeycomb configuration. In addition to the smaller floor space, the honeycomb configuration has the advantage that new hexagonal manufacturing cells 102 can be easily integrated into the existing honeycomb system, as shown in FIG. 6. Integrating additional manufacturing cells 102 scales up the production capacity and functionality of the entire manufacturing system 102. Therefore, the honeycomb configuration is optimally suited to scale up production capacity in a rapid and cost-effective manner with minimum floor space utilization.

Figure 7:
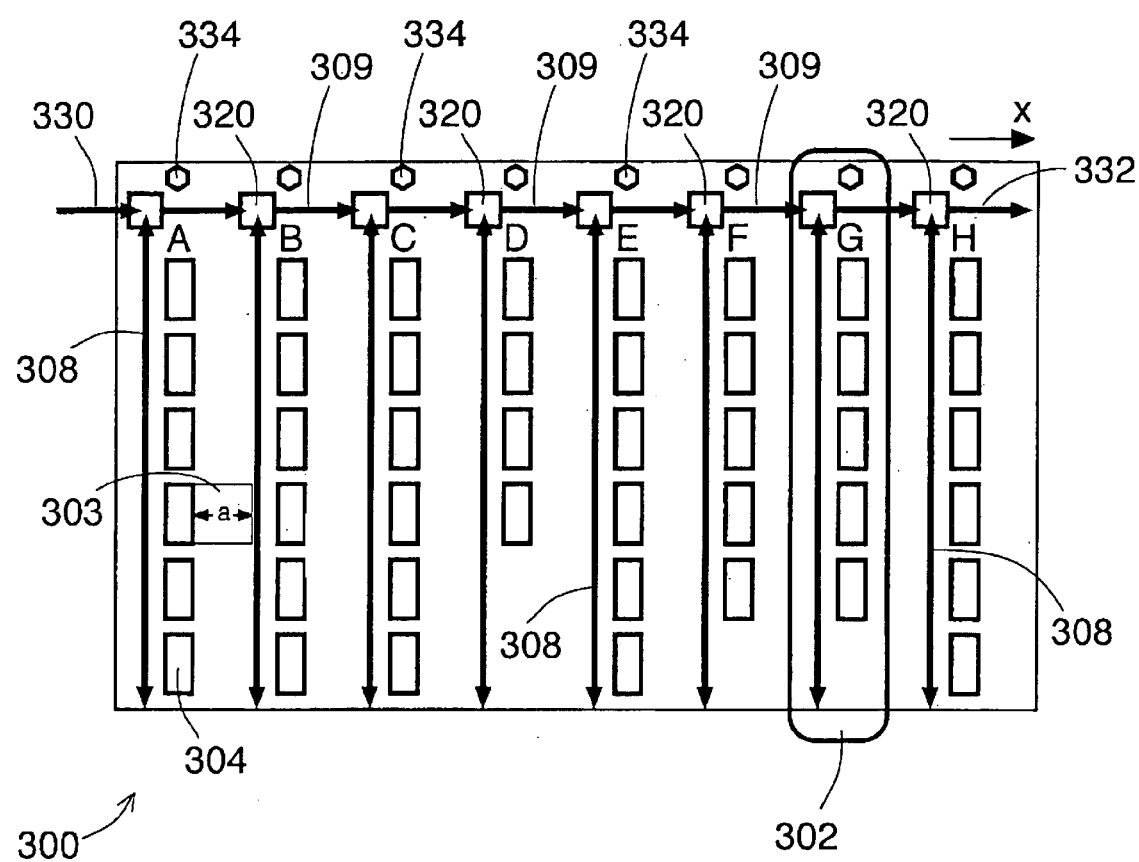
FIG. 7 is a diagram of another embodiment of an the integrated multi-stage manufacturing system.
Figure 8:
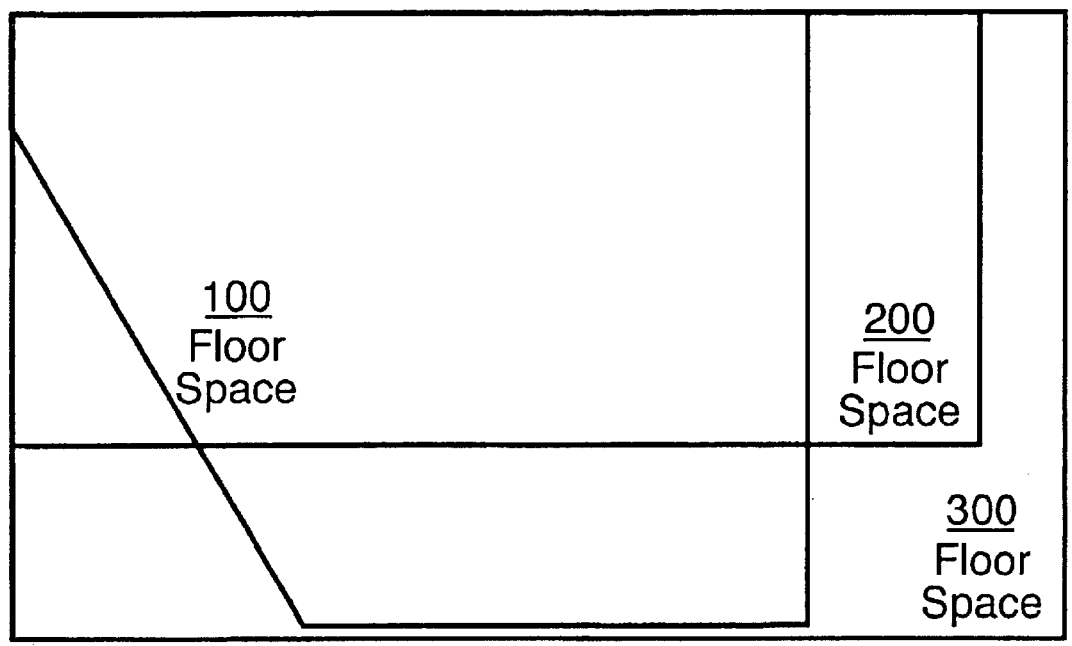
FIG. 8 is a comparison of floor space requirements of three embodiments of the integrated multi-stage manufacturing system.

Another embodiment of a multi-stage manufacturing system 300 is shown in FIG. 7. In all the embodiments of the manufacturing system, like elements designated with like reference numbers. The reference numbers have a first digit indicated an embodiment while the remaining digits indicate like elements in each embodiment. Reference numbers 102, 202, 302, etc., indicate manufacturing cells in corresponding embodiments 100, 200, 300, etc. In the embodiment of FIG. 7, the manufacturing system 300 is built as an array of cells 302 arranged in sequence. Each cell 302 may include identical parallel manufacturing stations 304 and is served by one cell gantry 308 of the type show in FIG. 3(*a*). In addition to the cell gantries 308, the manufacturing system 300 may include spine gantries 309. Each spine gantry 309 is a one-gripper overhead gantry that transports parts from one cell 302 to another cell 302 in one direction designated by an arrow "X". Each cell 302, is also served by a loop conveyor 320 that serves as an interface between cell gantries 308 and spine gantries 309, and also serves as a buffer for part storage. A manufacturing system 300 with N cells 302, requires N cell gantries 308, N−1 spine gantries 309, and N loop conveyors 320, as shown in FIG. 7, where N is eight. A comparison of the floor space requirements of embodiments 100, 200 and 300 is shown in FIG. 8.

One reason for the smaller floor space that is occupied by the honeycomb configurations 100 and 200 is their more efficient occupation of the floor space needed to serve the manufacturing stations or machines 104. Behind each machine 104, a machine-service area 103 must be reserved for maintenance people to work on the machine repairs as well as for a cart of cutting tools that the operator brings when changing the worn tools on the machine. As a rule of thumb, the needed service area 103 per machine is approximately $a^2$, where a is the length of the machine 104. In Reference to FIG. 7, for six machines 304, the total service area 303 in system 300 is $6a^2$. In contrast the service area 103 in the hexagonal cell 102 is a common area for all six machines 104. Assuming that the corners of the machines 104 are very close to each other as shown in FIG. 1(*b*), this common service area (CSA) is composed of six equilateral triangles with sides of length a. Therefore, the CSA can be calculated by geometry to be $$CSA=(3\sqrt{3}/2)a^2 \qquad \text{Equation 3}$$

Comparing the service areas in systems 100 and 200 on one hand (by using equation 3), and in system 300 on the other, it is observed that the total service area 103 for six machines 104 in the hexagonal cell 102, 202 is 2.3 times smaller than that the service area 303 of six machines in the system configuration 300. This smaller service area 103 is also a factor in the total smaller floor space that the honeycomb system embodiments 100 and 200 require.

Another reason for the smaller space occupied by the honeycomb system embodiments 100, 200 is that additional space is saved because there is no need for spine gantries.

The task of spine gantry 309 is to transfer a part forward, in the direction X, and then it returns to its original position for transferring another part in the direction X. For example, the spine gantry 309 that connects two consecutive loop conveyors 320 that are designated by "F" and "G", takes with its gripper a part that was completed at the cell 302 that corresponds to the loop conveyor F and is waiting on the loop conveyor 320-F, and transfers it to the loop conveyor 320-G for processing on one of the machines 304 of the corresponding cell 302. Then, the spine gantry 309 moves back to the loop conveyor 320-F with its gripper empty, and waits there for instruction to pick up the next part from the cell 302 that corresponds to the loop conveyor 320-F.

Figure 9:
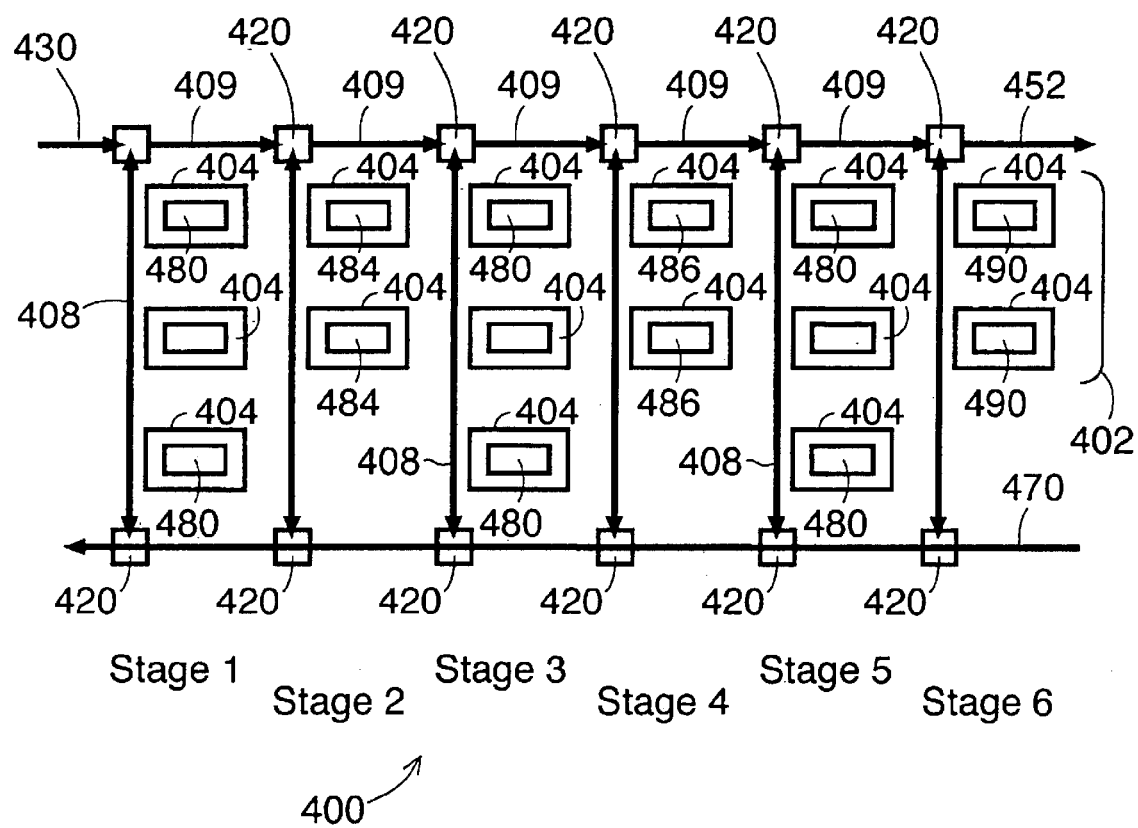
FIG. 9 is a diagram of another embodiment of an the integrated multi-stage manufacturing system.

Another embodiment 400 of an array-type manufacturing system is shown in FIG. 9. In the example illustrated in FIG. 9, the manufacturing system 400 may include six cells 402, each corresponding to a different manufacturing stage. This system 400 may also include cell gantries 408 that serve corresponding cells 402, and spine gantries 409 that interconnect loop conveyors 420 that interconnect the cell and spine gantries 408, 409 and also serves as buffers. The system 400 may be configured to produce simultaneously several types of parts (or products), all belong to the same part family (or product family). A part (or product) family is defined as a set of parts that have the same basic configuration of machinable features, such as holes, for example, but may include small dimensional variations from part to part. According to this definition, a six-cylinder engine block defines a family of parts, all of which have the same basic configuration of six cylinder bores, but with slight variation in the diameter of the bores in each part, for example.

Figure 10:
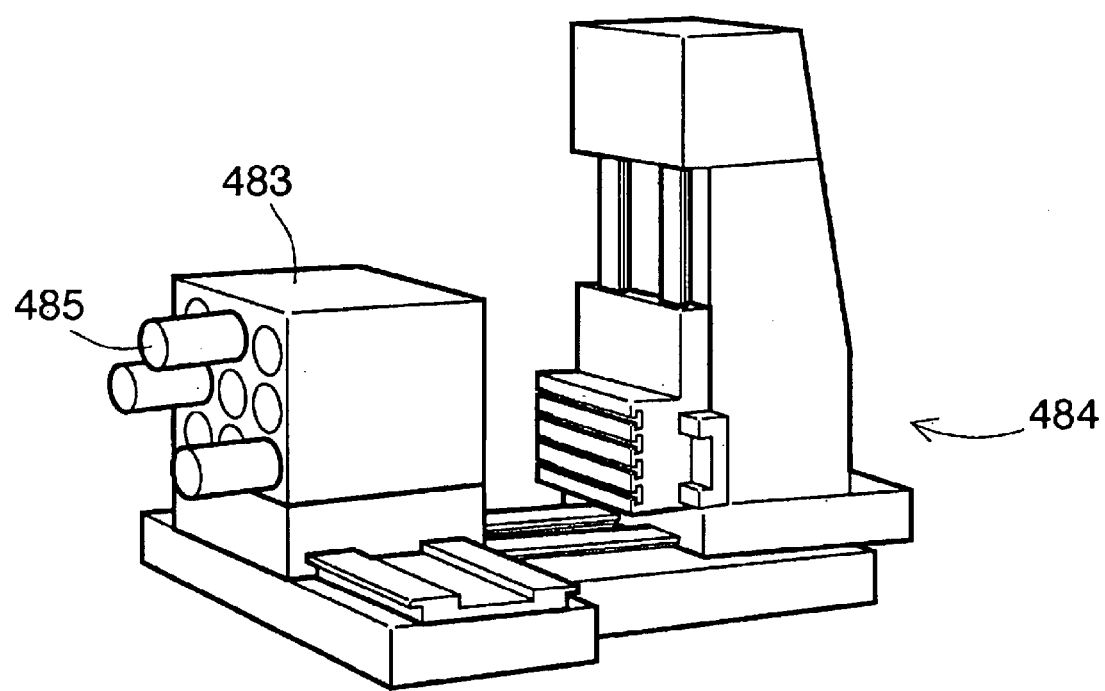
FIG. 10 is a perspective view of a regonfigurable machine tool (RMT)

In this embodiment, each of the cells 402 corresponds to a manufacturing stage and includes a number of identical machines 404, such that each stage has the number of machines 404 needed to meet production demand. The machines 404 may be of the flexible type, of the reconfigurable type or of the inspection type. One or more cells 402, for example, may include a number of flexible CNC machines 480 which may be identical within each cell. (e.g., a horizontal CNC milling machine; a vertical CNC machine) and there are enough of them to provide the required production capacity. In FIG. 9, for example, stages 1, 3 and 5 correspond to cells 402 including flexible CNC machines 480. This embodiment may also include cells 402 that incorporate machines 404 that are reconfigurable in order to combine the flexibility of CNC with the high productivity of dedicated lines. In the example illustrated in FIG. 9, the cells 402 that correspond to stages 2 and 4 incorporate such reconfigurable machines 404. Stage 2 in FIG. 9 includes part-family Reconfigurable Machine Tools (RMTs) 484, including reconfigurable spindle heads, that enhance productivity, for example, by drilling three parallel holes with different diameters at a single motion with a single spindle head 483 that contains three tools 485, as shown in FIG. 10. Examples of RMTs 484 are described in U.S. Pat. Nos. 5,943,750; 6,309,319; 6,557,235, and 6,569,071, all of which are co-owned by the assignee, and the entire contents of each of which are incorporated herein by reference.

Each RMT 484 may be dedicated to a certain part family, and can be rapidly reconfigured to produce different parts within the same part family, by changing the spindle head, for example. The production rate of each RMT 484 is many times higher than that of a regular CNC machine, because the RMT 484 may utilize a multi-spindle head described in U.S. Pat. No. 6,569,071. The manufacturing system 400 in FIG. 9 may produces two parts belonging to the same part family simultaneously, because the cell 402 that corresponds to stage 2 contains two RMT 484. This integration of RMTs 484 can enhance dramatically the overall production rate of the entire system 400.

The cell 402 that corresponds to the 4th stage contains regional machines 486, i.e. machines, including RMTs, that are dedicated to features required by a regional consumer. Therefore, the machines 486 in stage 4 may be different depending on which region of the world the manufacturing system 400 is installed. The same manufacturing system 400 may be built or installed in the USA, Europe, and Asia, for example, with different 4th stage machines 486 to adapt the parts and products to the local consumer preferences. This enables designing cost-effective, easily reconfigurable global manufacturing systems. Two regional machines 486 are shown in FIG. 9, as an example of a manufacturing system 400 capable of producing parts belonging to a single part family.

The manufacturing system 400 may also include a cell 402 that corresponds to a stage (the $6^{th}$ stage in the example of FIG. 9) dedicated to real time inspection of parts or products. Real time inspection may be performed using Reconfigurable Inspection Machines (RIM) 490, such as the one described in U.S. Pat. No. 6,567,162, which is co-owned by the assignee, and the entire contents of which are incorporated herein by reference.

The RIMs 490 may be integrated into the manufacturing system 400 such that the production flow may continues uninterrupted. As discussed above, the manufacturing system 400 illustrated in the example of FIG. 9 has the capability of producing parts corresponding to two different part families and therefore two RIMs 490, each dedicated to a different part family, are included. When one RIM 490 is not operational, the corresponding parts that were destined for inspection by the non-operational RIM 490 do not enter the cell 402 of the inspection stage 6 and the production flow is uninterrupted. These parts may be sent for example to a CMM inspection apparatus, as done traditionally. The parts that were destined to be inspected by the second RIM 490, which remains operational, continue to pass through the inspection stage 6. If desired, two RIMs 490 for each of the two part families may be added, such that there is a backup RIM 490 for each of the two different part families, thereby avoiding the use of CMMs in the event one RIM 490 is not operational.

In one embodiment, the manufacturing system 400 may include an additional backward material transporter 470, such as a gantry, for example. See FIG. 9. The backward material transporter 470 is also provided with loop conveyors 420 for transferring parts between the cell gantries 408 and the backward material transporter 470. In current multi-stage manufacturing systems in industry, the part or product moves sequentially from one stage to the next, but cannot move backwards. The backwards motion may be used to send back a part to a previous operation to either repair a defective part which was detected during inspection in stage 6 or otherwise, or in the case of a machine failure, to use an alternate process route (other than the straightforward one) in order to increase the system's production rate. For example, assuming that the machines 480 in stage 1 can perform also the tasks given to the machines 480 in stage 5, then in a case of a machine failure in stage 5, the part 118 can be sent back by the backward material transporter 470 from stage 4 to stage 1 for a processing that will be normally done at stage 5.

In another example, the backward material-transporter 470 may also take a part 118 that did not pass inspection at stage 6, transfer it backwards and place it on the lower loop conveyor 420 of Stage 2. The cell gantry 408 of stage 2 may pick up the part 118 from this loop conveyor 420 and transfer it to one of the RMTs 484 for reprocessing. After processing, the part 118 may be taken by the cell gantry 408 of stage 2, placed on the upper loop conveyor 420, and moved by the upper loop conveyor 420 to a place where it can be picked up by the spine gantry 409. Therefore, the additional material transporter 470 enhances the reconfigurability and productivity of the manufacturing system 400.

Figure 11:
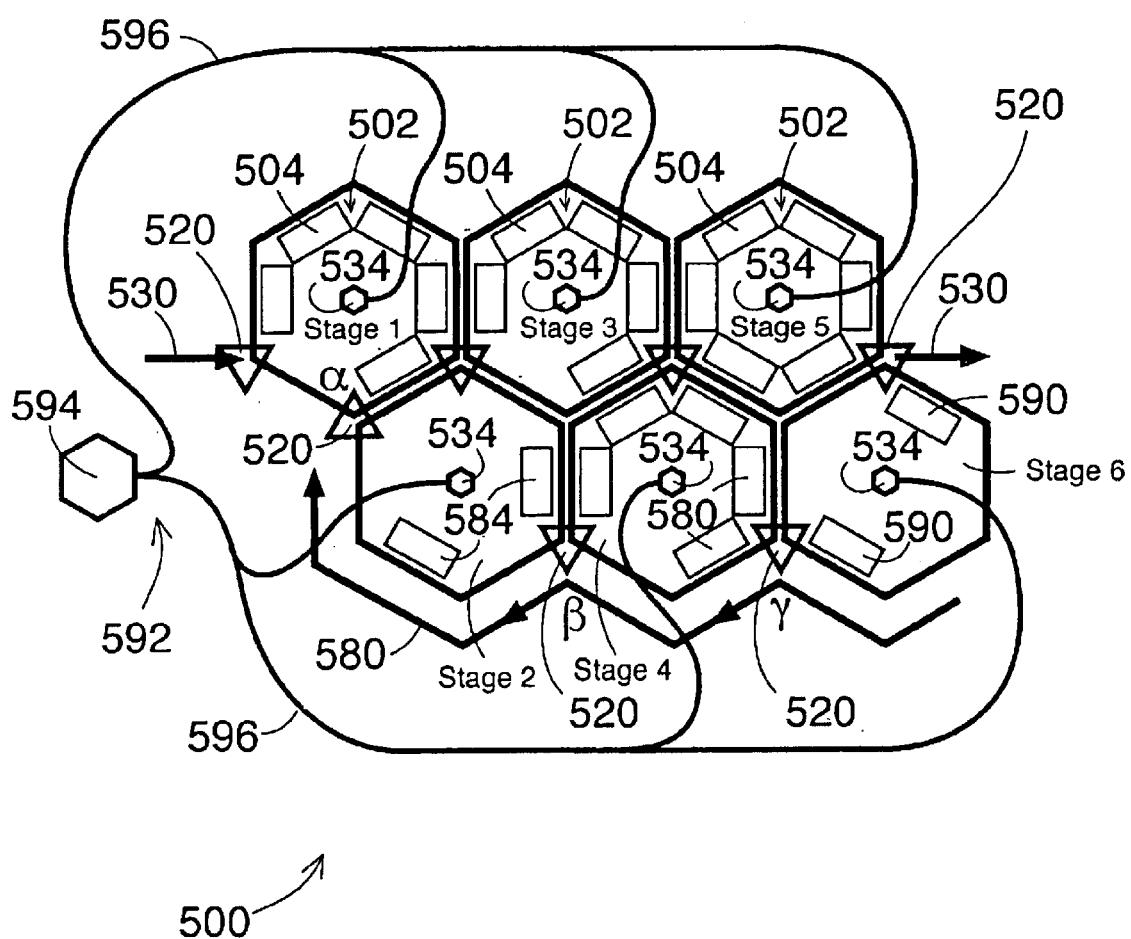
FIG. 11 is a diagram of another embodiment of an the integrated multi-stage manufacturing system.

In one embodiment, shown in FIG. 11, the manufacturing system 500, may integrate a honeycomb structure, such as, for example, the structure shown in FIG. 1 or 2 and described in connection the manufacturing system embodiments 100 and 200 respectively, with the manufacturing system embodiment 400 shown in FIG. 9, incorporating reconfigurable machines, such as RMTs 584 and real-time in-process inspection machines, such as RIMs 590, as well as the ability of transferring parts backward. It should be noted that common elements in embodiments 100, 200, 400 and 500 are indicated with the same two last digits, and their description is not repeated.

One hexagonal cell 502, for example the cell 502 that is associated with stage 2 of the manufacturing system 500, may contain one or more RMTs 584, each dedicated to the same family of parts. These RMTS 584 may be reconfigured for optimal productivity as explained in connection with embodiment 400. Another cell 502, for example the cell 402 that corresponds to stage 4 may include one or more regional RMTs 586, such as RMTs that are appropriate for the region in which the manufacturing system 500 is installed. Similarly, one of the cells 502, such as the cell 502 that is associated with an inspection stage 6, may contain one or more RIMs 590.

The honeycomb system 500 has the ability to transfer parts backwards without the need for a backward material transporter. A transfer of a part 118 from stage 6 to stage 1, for example, may be done by transferring the part 118 from a particular loop conveyor 520 designator by γ to another loop conveyor 520 designated by α by taking the part from loop conveyor γ to an intermediate loop conveyor 520 designated by β by the cell gantry 508 of a cell 502 associated with stage 4, and then taking it from loop conveyor β to loop conveyor α by the cell gantry 508 of stage 2. See FIG. 11.

The manufacturing system 500 may also include a control system 592 that includes a central command station 594 connected with a communications network 596. The communications network connects each cell control station 534 and each part that enters the manufacturing system 500 to the central command station 594. The commands that instruct the part motion are transferred via this communications network from the central command station 594 to the cell control stations 534, and from them to the cell gantries 508 and the machines 504 in the cells 502. When a machine 504 is down, or a loop conveyor 520 is full, the appropriate signal is sent from the cell control station 534 to the central command station 594 through the communications network 596. Based on this information, the central command station 594 makes the routing decisions for the part. Each part that is being processed in the system may have its own identification (ID) tag, e.g., a bar code or a radio frequency (RF) tag. The location of the part is communicated continuously to the central command station 594. Thus the central command station 594 may know exactly the location of each part (erg., on one of the loop conveyors 520, processed by one of the machines 504, in one of the gantries 508, etc.). The information regarding the location of each part coupled with the information about the operational condition of each machine 504 and each loop conveyor 520 enables the central command station 594 to send routing commands for the parts, such as, for example, that a certain part has to bypass inspection or a certain part has to move backwards to a previous stage for processing. Such control is defined herein as "dynamic routing".

Figure 12:
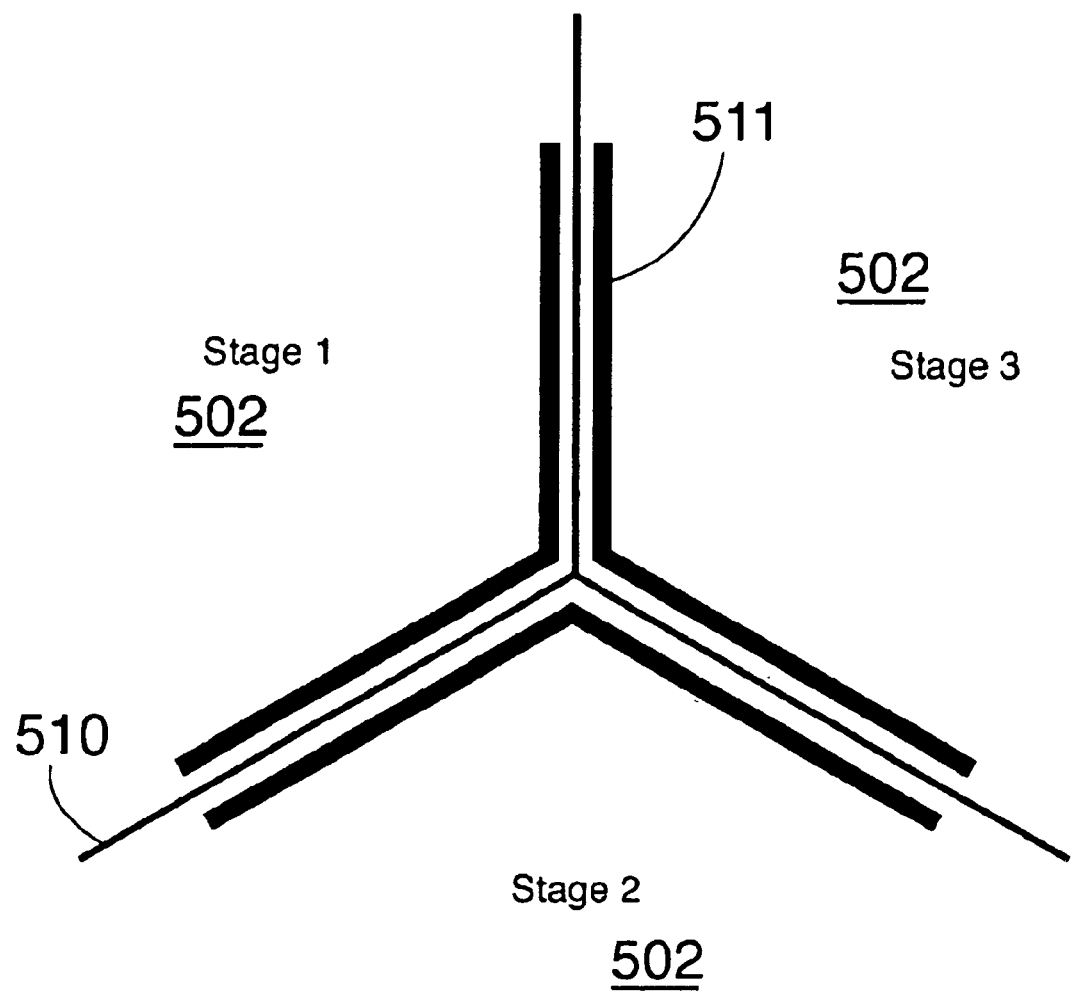
FIG. 12 is a diagram of a track transfer mechanism.

The manufacturing system 500 may include one or more cell gantries 508 that may serve one or more cells 502. For example, by using a Y-shaped track transfer mechanism 511, the cell gantry 508 of stage 1 may also travel in the tracks 510 of the cell gantry of stage 2, serving thereby two cells, if desired. See FIG. 12. The track transfer mechanism 511 may be include a remotely controlled linear motor or a controlled shifting device similar to those used to shift trains from one rail track to another. The gantry 508 of stage 1, therefore, may be directed to work also at stage 2, in addition to its normal tasks in stage 1.

The various embodiments of the manufacturing systems of the present invention offer considerable advantages over the prior art. The use of the cell-based honeycomb architecture, for example, conserves valuable floor space and allows easy addition and integration of cells to increase production capacity. The integration of part-family RMTs into the system enables the system to combine the high productivity of dedicated stations with the flexibility of CNCs, thereby achieving unprecedented high productivity for the production of a variety of parts. High flexibility in part routing is achieved by enabling backward transfer of parts. Real time in-process inspection of parts is enabled by incorporating RIMs in the manufacturing system. The integration of regional RMTs accommodates the processing of special part features targeting a regional market. The networking of the local cell-based control stations to a central command station enables the efficient operation of the entire system and dynamic routing of parts.

Although embodiments of the invention were described in the context of machining systems for the purpose of illustrating the invention, it will be appreciated that the invention is equally applicable to other manufacturing processes, such as, for example, assembly, shoe production, and semiconductor fabrication, and other manufacturing processes. It will also be appreciated by those of ordinary skill in the art that numerous variations of the details, materials and arrangement of parts may be made within the principle and scope of the invention without departing from the spirit of the invention. The preceding description, therefore, is not meant to limit the scope of the invention. Rather the scope of the invention is to be determined only by the appended claims and their equivalents.

What is claimed is:

1. An integrated multi-stage manufacturing system comprising
- a plurality of manufacturing cells, each cell associated with at least one stage of a manufacturing process, the plurality of cells including:
  - a first cell comprising at least one flexible manufacturing station;
  - a second cell comprising at least one reconfigurable manufacturing station; and
  - a third cell comprising at least one reconfigurable inspection machine;
- a plurality of loop conveyors, each loop conveyor connecting at least two neighboring cells;
- a plurality of cell gantries, each cell gantry transporting parts from the cell to at least one loop conveyor; and
- wherein each cell is hexagonal and the plurality of cells forms a honeycomb structure.

2. The system of claim 1, wherein each cell gantry moves on tracks that are adjacent and around the cell.

3. The system of claim 2, wherein each cell gantry comprises first and second grippers for loading and unloading parts.

4. The system of claim 3, wherein the manufacturing station includes a rotary table.

5. The system of claim 2, wherein each cell gantry moves parts from a corresponding loop conveyor to the cell.

6. The system of claim 5, wherein each loop conveyor is accessible to at least two cell gantries.

7. The system of claim 6, wherein each loop conveyor comprises temporary storage space.

8. The system of claim 6, wherein each loop conveyor is triangular.

9. The system of claim 2, further including a track transfer mechanism for moving the cell gantry of one cell to the tracks of the cell gantry of another cell.

10. The system of claim 1, wherein each cell includes a cell control station.

11. The system of claim 10, wherein each cell control station communicates with a central command station.

12. The system of claim 11, wherein the central command station includes control of dynamic routing of parts.

13. The system of claim 1, wherein the plurality of cells are positioned to minimize a floor space occupied by the system.

14. The system of claim 1, further comprising a fourth cell including at least one regional reconfigurable manufacturing station.

15. An integrated multi-stage manufacturing system comprising
- a plurality of manufacturing cells, each cell associated with at least one stage of a manufacturing process, the plurality of cells including:
  - a first cell comprising at least one flexible manufacturing station;
  - a second cell comprising at least one reconfigurable manufacturing station; and
  - a third cell comprising at least one reconfigurable inspection machine;
- a plurality of loop conveyors, each loop conveyor connecting at least two neighboring cells;
- a plurality of cell gantries, each cell gantry transporting parts from the cell to at least one loop conveyor; and
- a spine gantry between the loop conveyors of two neighboring cells, each spine gantry moving parts in a forward direction from stage to stage, and wherein the plurality of cells forms a linear array.

16. The system of claim 15, further including a material transporter moving parts from stage to stage in a backward direction.

* * * * *